H. G. HORSTMAN.
SPRING WHEEL.
APPLICATION FILED SEPT. 3, 1915.
1,246,431.
Patented Nov. 13, 1917.
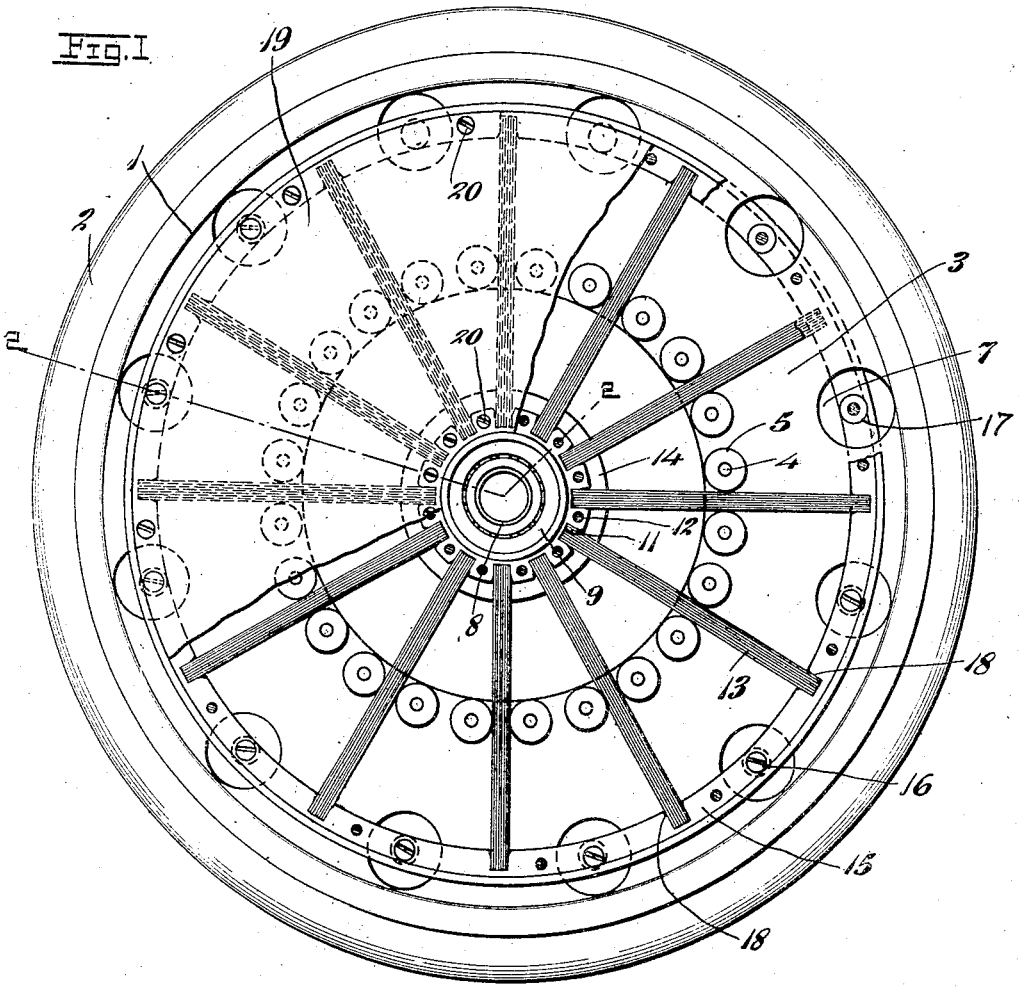
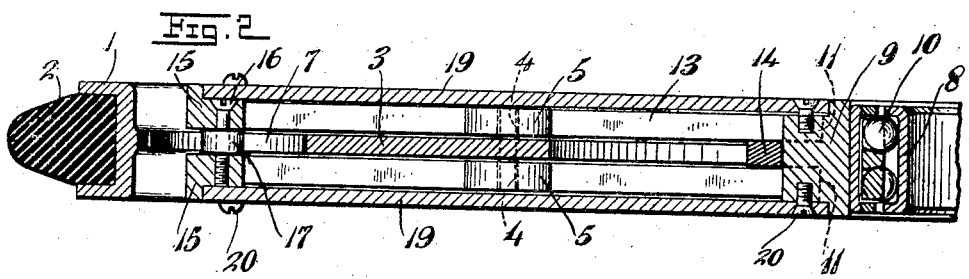
INVENTOR.
Horace G. Horstman
BY
Allen & Allen
ATTORNEYS

UNITED STATES PATENT OFFICE.

HORACE G. HORSTMAN, OF CINCINNATI, OHIO.

SPRING-WHEEL.

1,246,431.     Specification of Letters Patent.     Patented Nov. 13, 1917.

Application filed September 3, 1915. Serial No. 48,764.

*To all whom it may concern:*

Be it known that I, HORACE G. HORSTMAN, a citizen of the United States, and a resident of the city of Cincinnati, in the county of Hamilton and State of Ohio, have invented certain new and useful Improvements in Spring-Wheels, of which the following is a full, clear, and exact description, reference being had to the accompanying drawings, forming part of this specification.

My invention relates to spring wheels for road vehicles and the like, to take the place of pneumatic tires for such vehicles and to adequately fulfil the functions of such tires.

In wheels of this character, the great difficulty is in providing a wheel which will be able to withstand the strain of road travel without breaking down, or else without losing the elasticity and resiliency necessary to take up the shocks and jars of the uneven road surface. There are a great number of spring wheels for the above stated purpose, but they have never been successful because the springs have not been able to keep up and at the same time preserve their elasticity, or else the structures have been so heavy and complicated that they were impractical as a pneumatic tire substitute.

In wheels of this character, also, in order to hold the parts together against road travel, it has been the general rule that the parts of the wheel are so locked into place that it has been necessary to take them into the shop for any repairs that may be necessary.

It is the object of this invention to provide a spring wheel in which the springs are capable of withstanding all the strains to which they may be subjected. It is further the object to support the springs in such a manner that they will be easily removable for replacement in case of breakage without taking the vehicle to the shop for this purpose. Finally it is the object to provide a wheel of the above character wherein the springs are straight and set in radially to the hub of the wheel, thereby gaining the advantages of the fullest spring support in all directions.

These objects and other advantages to be noted, I accomplish by that certain construction and arrangement of parts to be hereinafter more specifically pointed out and claimed.

In the drawings,

Figure 1 is a side elevation of the wheel, with the outer covering broken away to show the spring mounting.

Fig. 2 is a section thereof, taken on the lines 2, 2, of Fig. 1.

The wheel of my invention has a felly 1, on which is mounted a tire 2, of rubber or the like, in the ordinary manner. It is preferred to have this tire of fairly soft and springy rubber so that the rubber itself will take up the small jars in the road. I have found that in a spring wheel or in a pneumatic wheel the rattle or jar given to the axle of a vehicle by a rough pavement, such as granite blocks or the like, is not taken up by the tire of the wheel unless the same is of such consistency that it will spread and give in passing over the road. Accordingly I prefer to have the tire 2 of a nature which will have considerable give to small roughness on the road.

Extending inwardly from the wheel and preferably unitary with the felly is a felly support illustrated as a deep flange 3, which has spaced closely around it a series of studs or pins 4, which extend on both sides of the flange. On these pins are mounted the antifriction and suspension rollers 5, which engage on each side of the springs as will be described. The flange is also cut out in a series of circular apertures 7, 7, for clearance spaces, as will be noted.

Mounted on a flanged sleeve 8, which is designed to fit over the axle (not shown) is a hub member 9. This hub member is supported on ball bearings 10 in the usual manner and has its periphery cut to form the alternate slots and ridges 11, 12. Each of the slots 11 serves as the mounting for one end of a composite spring formed of a bundle of straight spring strips 13, 13, which is set into the slot and extends away radially from the hub portion. A spacer ring 14 is set loosely around the middle of this hub, dividing the slots into two, and the spring bundles are set in pairs, one on one side and one on the other side of the hub slots.

These springs extend radially and pass between the rollers 5, which are on the wheel flange, and the wheel is thereby suspended on the springs. The outer ends of the bundles of springs are supported as follows. Two hub-supported rings 15, 15, are provided, of a size to extend around the wheel flange adjacent to the clearance apertures 7, 7, above mentioned. There will be one ring on each side of the flange and they are connected together by screws 16, 16, which extend through the clearance spaces and have rollers 17, 17, mounted over them on their intermediate portions.

The rings have a series of notches 18, 18, cut in them and these notches receive the outer ends of the bundles of springs.

The rings 15 have mounted on them the cover plates 19, 19, one on each side, which plates are secured by screws 20 to the rings and the hub, and serve to hold the springs and rollers in place.

As so constructed, the operation of the wheel is easily understood. The wheel itself is supported on the springs by the contact of the rollers on the wheel flange which are set so as to engage on each side of each spring. When the wheel passes over a depression, the laterally extending ones of the radial springs will be bent under spring tension and the upper and lower springs will move vertically. The outer rings in which the springs are mounted are free to move a given space as controlled by the clearance spaces in the wheel flange.

The spring carrying members may also turn against spring tension within the wheel flange, as the clearance spaces are circular and the binding screws of the two outer spring retaining members have antifriction rollers 17, 17, on them as described.

The entire spring structure is easily removable and is held in place by the cover plates only. The springs themselves may be easily pried out of the grooves in which they seat when pressure is taken off of them by jacking up the wheel. The rollers which suspend the wheel on the springs are also easily removable, as they are merely set down on the studs 4 on the wheel flange.

Thus the torsional and vertical strains on the wheel are all taken up by a simple, durable and easily demountable spring structure, the wheel and felly being entirely supported by the rollers on the flange of the wheel.

It is believed that the various advantages of my invention are now apparent. It is not desired to be limited to specific structure in the claims that follow, because of a failure to mention the various equivalent structures which might be substituted in my wheel without departing from the spirit of the invention therein.

Having thus described my invention, what I claim as new and desire to secure by Letters Patent, is:—

1. In a spring wheel, a hub member, an annular member spaced therefrom and rigidly secured thereto, a series of substantially radially extending springs having their ends mounted in said members, a felly surrounding but spaced from said hub-supported member, an inwardly projecting felly support mounted on said felly and means mounted on said support for engaging said springs at points intermediate their ends and for thereby supporting said felly on springs of said series.

2. In a spring wheel, a hub member, an annular member spaced therefrom and secured thereto, a series of radial springs extending from the hub member to said annular member and mounted on said members, a felly surrounding said annular member, means mounted on said felly for movably engaging said springs at points intermediate their ends, and for thereby yieldingly supporting said felly on said hub member, and motion limiting devices between said annular member and said means.

3. In a spring wheel, a hub member, a member spaced therefrom and rigidly secured thereto, radially extending springs extending between said members and having their ends loosely mounted therein, a felly, and means mounted on the felly for engaging said springs at points substantially mid-way between their ends and movable along said springs to accommodate relative motions between said members and said felly.

4. In a spring wheel, a hub member, a member spaced therefrom and rigidly secured thereto, a plurality of radially extending springs extending from said hub member to said second mentioned member, and having their ends movably supported on said members, a felly surrounding said annular member, an inwardly projecting annular flange mounted on said felly, and rollers journaled on said flange for engaging said springs at points intermediate their ends and for thereby yieldingly mounting said felly on said members.

5. In combination in a spring wheel, a hub member, hub-supported members spaced therefrom, two sets of radial springs, the springs of each set extending from the hub member to one of the hub-supported members and having their ends movably mounted in said members, said sets being spaced apart axially of said hub member, a felly, a felly support projecting inwardly between said hub-supported members and the two sets of springs, and means carried by said support for engaging the springs at points intermediate their ends and for thereby yieldingly supporting said felly on said members.

6. In combination in a spring wheel, a hub member, two annular members spaced apart and spaced from said hub member, a set of radially extending springs between each annular member and said hub member, a separate cover plate for securing each annular member to said hub member and for holding the springs of the adjacent set in place in spring engaging slots formed in said members, a felly surrounding said annular members but spaced therefrom, a felly support carried by said felly and projecting inwardly between said annular members and the two sets of springs, and rollers mounted on both sides of said support for engaging said springs at points intermediate their ends and thereby yieldingly supporting said felly on said hub member.

7. In combination in a spring wheel, a hub member, two annular members spaced apart and surrounding but spaced from said hub-member, a separate set of radially extending composite springs between each annular member and said hub member, having their ends loosely mounted in spring engaging slots formed in said members, a separate disk for securing each annular member to said hub member and engaging said springs and holding them in place in said slots, a felly surrounding said annular members but spaced therefrom, a felly support carried by said felly and projecting inwardly between said annular members and said sets of springs, antifriction devices mounted on said support for engaging said springs of both sets and for thereby yieldingly mounting said felly on said hub member, and motion limiting devices between said annular member and said support.

8. A spring wheel, comprising a hub member, having spring-engaging slots formed therein, an annular member surrounding said hub member but spaced therefrom and having spring-engaging slots formed therein, substantially radially extending composite springs, comprising straight spring strips, extending between said members, each spring having its ends loosely mounted in said spring-engaging slots of said members, a disk rigidly secured to said members and engaging said springs to hold them in place in said slots, a felly spaced from said annular member, an inwardly projecting felly support carried by said felly and anti-friction devices mounted on said support for engaging said springs at points intermediate their ends and for thereby yieldingly mounting said felly on said hub member.

HORACE G. HORSTMAN.

Copies of this patent may be obtained for five cents each, by addressing the "Commissioner of Patents, Washington, D. C."